Feb. 16, 1965     E. D. MYERS     3,169,594
SPRING SCALE WITH DIAL INDICATION
Filed Sept. 7, 1962
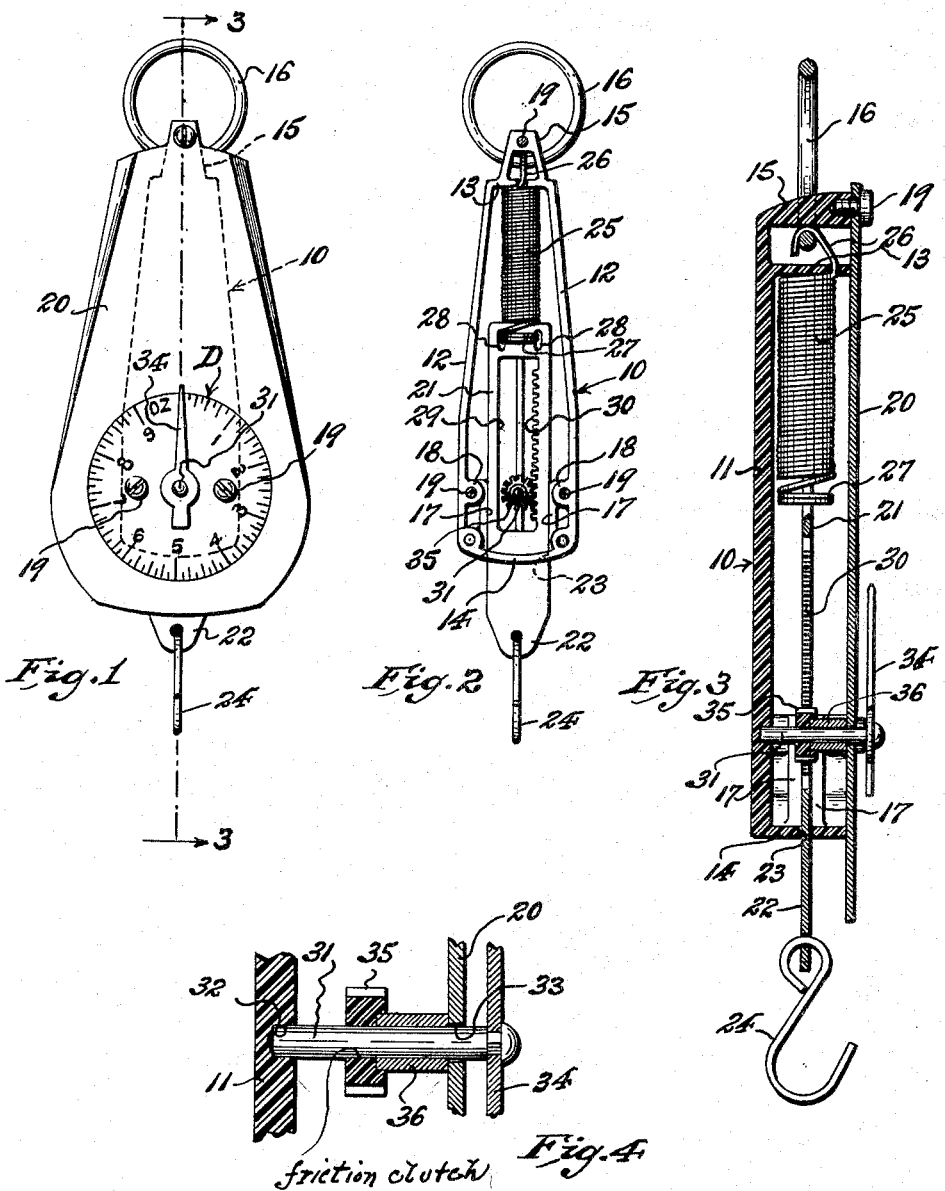
INVENTOR.
Earl D. Myers,
BY Richards and Cifelli,
Attorneys United States Patent Office 3,169,594
Patented Feb. 16, 1965

3,169,594
SPRING SCALE WITH DIAL INDICATION
Earl D. Myers, Scotch Plains, N.J., assignor to Ohaus Scale Corporation, Union, N.J., a corporation of New Jersey
Filed Sept. 7, 1962, Ser. No. 222,104
3 Claims. (Cl. 177—173)

This invention relates to improvements in hanging type spring scales provided with a dial graduated to indicate desired weight units, and a rotatable pointer adapted to cooperate with said dial, and including spring controlled rack and gear means for actuating the pointer.

Dial spring scales of the hanging type are known to the prior art, but, in such known scales, the gear of the rack and gear spring controlled pointer actuating means is rigidly and immovably mounted on the pointer shaft. Owing to this, the dial of the scale must be a separate element mounted upon the face plate of the scale, and means must be provided to adjust this dial relative to its attached and fixed relation to the scale face plate and to the pointer, in order to adjust the pointer to a normal zero indicating position relative to said dial. Such arrangement not only involves multiplication of the parts of the scale and thereby increases the task of assembling said parts in the make-up and completion of the scale, but also limits the adjusting movement of the dial relative to the pointer, so that accuracy of the relationship thereof may well be impaired. Furthermore, should the pointer be obstructed during use and operation of the scale, said pointer may well be deformed, and thus further contribute to inaccuracy of weight indication.

Having these defects of prior art embodiments of dial spring scales of the hanging type, it is an object of this invention to provide an improved and simplified construction of such type of scales which avoids said defects.

It is a further object of this invention to provide a dial spring scale of the hanging type in which the dial is preferably inscribed directly upon the face plate, thus furnishing a one-piece combined face plate and dial element.

Another object of this invention is to provide a novel construction of spring controlled rack and gear pointer actuating means, wherein the gear thereof is mounted on the pointer shaft by a frictional clutch connection with the latter, thus permitting the pointer to be rotated relative to the driving gear, so that when the rack and gear assembly is manually held stationary, the pointer can be quickly and easily adjusted to a zero indicating position relative to the scale dial; this arrangement also allowing the pointer and its shaft to slip relative to the driving gear, in the event the pointer movement is accidentally obstructed during use of the scale, thus preventing distortion of the pointer or other damage to the scale mechanism.

The above and other objects will be understood from a reading of the following description of an illustrative embodiment of the scale according to this invention in connection with the accompanying drawings thereof, in which drawings:

FIG. 1 is a front face elevational view of a dial spring scale according to this invention;

FIG. 2 is a front elevational view of the scale, with the combined face plate and dial element removed;

FIG. 3 is a longitudinal sectional view, taken on line 3—3 in FIG. 1, but drawn on an enlarged scale; and FIG. 4 is a fragmentary longitudinal sectional view, similar to that of FIG. 3, but drawn on a further enlarged scale.

Like characters of reference are applied in the above described views of the drawings, to indicate corresponding parts.

Referring to said drawings, the reference character 10 indicates the body or casing of the scale structure, the same comprising a back wall 11, side walls 12, a top end wall 13, and a bottom wall 14; thus providing a hollow body or casing, which is outwardly open at its front. At its upper end, to project upwardly from the top wall 13, and preferably integral therewith, is a hollow suspension section 15 of reduced width, through which and its hollow interior is engaged an external suspension ring 16. Within the lower interior of the body or casing 10, to project inwardly from the respective side walls 12 thereof, are laterally spaced apart and opposed guide members 17, adapted to provide a guideway for the rack plate of the rack and gear means of the scale mechanism, to be hereinafter more specifically described. Formed in connection with said opposed guide members 17 are internally screw-threaded bosses 18, and, in like manner, the suspension section 15 of the body or casing is also provided with an internally screw-threaded socket, all of which are adapted to be engaged by fastening screws 19, whereby to affix a face plate 20 having inscribed thereon or otherwise immovably affixed thereto a dial element, to and across the open front of the body or casing 10. It will thus be obvious that said combined face plate and dial element 20 can be rigidly and immovably affixed to the body or casing 10 at least at three points, thus assuring a fixed unitary relationship of these assembled elements. Although said body or casing 10 can be produced from any suitable material, either as assembled parts or as a molded integral structure, it is preferable to form the same as an integral one-piece body which is molded from a suitable plastic material.

Slidably supported by the guide members 17 of the body or casing 10, for longitudinal movement relative thereto, is a rack plate 21, which extends in a plane intermediate and parallel to the planes of the body or casing back wall 11 and said combined face plate and dial element 20. The lower end portion 22 of the rack plate 21 projects exteriorly from the lower end of the body or casing 10 through an opening 23 with which the bottom wall 14 of the latter is provided. Attached to said exterior end portion 22 of the rack plate 21 is a hook element 24, upon which may be detachably suspended material desired to be weighed in use of the scale.

The rack plate 21, as is customary in spring scales of the type to which this invention relates, is suspended by a tensionally extensible spiral spring 25, this spring having a suspension hook 26 at its upper end, which preferably passes upwardly through the top wall 13 of the body or casing 10, to engage over, and thus be anchored by that portion of the suspension ring 16 which is engaged through the suspension section 15 of the body or casing 10 (see FIGS. 2 and 3). The lower terminal coils 27 of the spring 25 are engaged through openings 28 with which the upper end portion of the rack plate 21 is provided, thereby to couple said spring 25 in operative supporting relation to the rack plate (again see FIGS. 2 and 3).

The rack plate 21 is provided in its body with a longitudinally extending opening 29, one marginal side edge of which is formed to provide rack teeth 30.

Extending across the body or casing 10, perpendicular to the rack plate 21, and through the opening 23 in said face plate and dial element 20, is a dial pointer shaft 31. The inner end of said shaft is journaled in a bearing socket 32 with which the back wall 11 of the body or casing 10 is provided. The outer end of said shaft projects exteriorly from the face plate 20 through a snug fitting bearing opening 33 with which the latter is provided. Affixed to said exterior end of the shaft 31 is a dial pointer 34. Mounted on the shaft 31 is a driving compact gear 35, the teeth of which mesh with the teeth 30 of the rack plate 21, so that the gear will be rotated by longitudinal movements of the latter. Said gear 35 is preferably made of a plastic material, e.g. nylon, and is connected with the shaft by a force fit. The plastic gear, as thus mounted on the shaft, possesses a high coefficient of friction in its compact area of contact with the shaft, and is thereby frictionally clutched to the shaft in normal driving relation thereto when rotated by the rack plate 21, while nevertheless permitting the shaft and the dial pointer 34 to be rotated relative to the rack and gear mechanism, when the latter is manually held against movement. Also mounted on the shaft 31, preferably in force fitted relation thereto, between the gear 35 and the face plate 20, is a short spacer collar or hub 36, which serves to retain the shaft against axial displacement.

Inscribed directly upon the outer surface of the face plate 20, and concentric to the pointer shaft 31, is a weight indicating dial D, which can be suitably graduated to indicate desired units of weight, e.g. ounces (see FIG. 1), or grams or other weight units not shown, or both.

Due to the novel frictionally clutched compact connection of the gear 35 with the pointer shaft 31, the dial pointer 34 can be quickly and easily manually rotated and adjusted relative to the dial D to an initial zero setting relative to the dial graduations, since by holding the rack and gear mechanism stationary in its normal spring relaxed raised position, the pointer and shaft can be turned relative to the stationary gear 35, the friction clutch relation of the gear to the shaft readily yielding to such pointer and shaft adjusting movement. Another advantage of the yieldable friction clutched relation of the gear 35 to the pointer shaft 31 is that, should movement of the pointer 34, during use of the scale, be accidentally obstructed, the pointer and shaft will yield relative to the gear 35, and consequently bending or other distortion of the pointer 34 or other damage to the scale mechanism will be avoided.

Since the dial D is inscribed directly upon the face plate 20, requirement for a separate dial plate is avoided; furthermore, all risk of eccentric displacement of the dial relative to the shaft 31 and pointer 34 is therefore likewise avoided.

It will be obvious that the weighing operation of the scale of this invention in use will be in accord with that well known to the art as to scales of the dial spring balance type.

Having now described my invention, I claim:

1. A hanging weighing scale of the type described comprising an open front hollow casing, a spring suspended rack plate within said casing having a lower end portion projecting from the bottom end of the latter including means to attach material to be weighed thereto, a face plate affixed to the casing across the open front thereof, a shaft supported by the casing and face plate perpendicular to the rack plate with its forward end projecting exteriorly from said face plate, a weight indicating dial immovably applied to the front of the face plate concentric to said shaft, a pointer element affixed to the exterior end of the shaft for cooperation with the dial, and a compact driving gear comprising material possessing a high coefficient of friction, said gear being mounted on the shaft in forced fit relation thereto and thus in compact frictional clutched engagement therewith, the teeth of said gear meshing with the teeth of the rack plate, whereby to be rotated by longitudinal movements of the rack plate and thus to actuate the shaft and pointer element.

2. A weighing scale according to claim 1 wherein the dial is directly inscribed upon the outer surface of the face plate.

3. A weighing scale according to claim 1, wherein the gear is formed from nylon.

References Cited in the file of this patent

UNITED STATES PATENTS

| | | |
|---|---|---|
| 393,340 | Nolan | Nov. 20, 1888 |
| 698,334 | Smith | Apr. 22, 1902 |
| 848,740 | Hansen | Apr. 2, 1907 |
| 1,449,254 | Zucker | Mar. 20, 1923 |
| 1,741,952 | Porter | Dec. 31, 1929 |
| 2,244,621 | Hurt | June 3, 1941 |
| 2,577,491 | Teter | Dec. 4, 1951 |

FOREIGN PATENTS

| | | |
|---|---|---|
| 834,844 | Great Britain | May 11, 1960 |